US012506190B2

(12) United States Patent
Suzuki et al.

(10) Patent No.: US 12,506,190 B2
(45) Date of Patent: Dec. 23, 2025

(54) BATTERY-MODULE TEMPERATURE INCREASE METHOD AND CELL BALANCING METHOD USING THE SAME

(71) Applicant: SUBARU CORPORATION, Tokyo (JP)

(72) Inventors: Norio Suzuki, Tokyo (JP); Hiroshi Abe, Tokyo (JP); Kazuya Tachimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 790 days.

(21) Appl. No.: 17/840,122

(22) Filed: Jun. 14, 2022

(65) Prior Publication Data
US 2023/0008149 A1    Jan. 12, 2023

(30) Foreign Application Priority Data

Jul. 9, 2021 (JP) .................. 2021-114174

(51) Int. Cl.
*H01M 10/615* (2014.01)
*H01M 10/42* (2006.01)
(Continued)

(52) U.S. Cl.
CPC ....... *H01M 10/615* (2015.04); *H01M 10/425* (2013.01); *H01M 10/482* (2013.01); *H01M 10/625* (2015.04); *H01M 10/657* (2015.04); *H02J 7/0016* (2013.01); *H02J 7/0048* (2020.01); *H01M 2010/4271* (2013.01); *H01M 2220/20* (2013.01)

(58) Field of Classification Search
CPC ... H02J 7/0016; H01M 10/615; H01M 10/625
See application file for complete search history.

(56) References Cited

U.S. PATENT DOCUMENTS

2005/0274705 A1    12/2005  Zhu et al.
2006/0022646 A1 *  2/2006  Moore .................. H02J 7/0029
                                                          320/150
(Continued)

FOREIGN PATENT DOCUMENTS

JP    2001085074 A  *  3/2001
JP    2005-340211 A    12/2005
(Continued)

OTHER PUBLICATIONS

Japanese Office Action, dated Mar. 18, 2025 in Japanese Application No. 2021-114174 and English Translation Thereof.

*Primary Examiner* — Julian D Huffman
*Assistant Examiner* — John P Ondrasik
(74) *Attorney, Agent, or Firm* — MCGINN I.P. LAW GROUP, PLLC

(57) ABSTRACT

A method for raising a temperature of a battery module for a vehicle. The method including generating heat in one or more resistors of the battery module by supplying one or more voltages from at least a part of cells of the battery module. The battery module includes the cells coupled in series, and the one or more resistors configured to generate heat after being energized and cause temperature of the cells to be raised. Voltages of the cells are subjected to monitoring and controlling by a cell monitoring unit of the battery module.

4 Claims, 7 Drawing Sheets

(51) Int. Cl.
  *H01M 10/48*     (2006.01)
  *H01M 10/625*    (2014.01)
  *H01M 10/657*    (2014.01)
  *H02J 7/00*      (2006.01)

(56) References Cited

U.S. PATENT DOCUMENTS

2006/0125447 A1* 6/2006 Sugimoto ............. H02J 7/0016
                                                  320/132
2012/0094151 A1* 4/2012 Kim ...................... H02J 7/0016
                                                  429/61
2018/0145520 A1* 5/2018 Sasaki .................. H02J 7/0014

FOREIGN PATENT DOCUMENTS

| JP | 2010-097923 A | 4/2010 |
| JP | 2020-174458 A | 10/2020 |
| JP | 2021-061719 A | 4/2021 |

* cited by examiner

BATTERY-MODULE TEMPERATURE INCREASE METHOD AND CELL BALANCING METHOD USING THE SAME

CROSS-REFERENCE TO RELATED APPLICATIONS

The present application claims priority from Japanese Patent Application No. 2021-114174 filed on Jul. 9, 2021, the entire contents of which are hereby incorporated by reference.

BACKGROUND

The disclosure relates to a battery-module temperature increase method and a cell balancing method using the same, for example, a battery-module temperature increase method for a cold environment and a cell balancing method using the same.

The capacity of a battery module installed in the vehicle is reduced in a very low temperature environment where, for example, the outside temperature falls below zero, and the reduced capacity is potentially hazardous to vehicle driving or the like. The temperature of the battery module is to be raised appropriately.

The battery module includes a plurality of cells. Variation in the states of charge (SOCs) of the respective cells may be limited within a predetermined range, that is, the SOCs of the cells may be balanced (hereinafter, balancing the SOCs of the respective cells is referred to as cell balancing). This is because continuous use of the battery module with a wide SOC variation leads to progressive deterioration of a cell with a low SOC and thus shortens the life of the battery module.

In Japanese Unexamined Patent Application Publication (JP-A) No. 2010-097923, to raise the temperature of the battery module, resistors are attached to metal bus bars each coupling cells of a battery module together, and heat is generated by supplying a voltage to each resistor from an external apparatus.

FIG. 7 illustrates a schematic diagram of the configuration of such a battery module. A plurality of cells 12 are coupled in series in a battery module 10, and thereby a predetermined voltage is achieved. A cell monitoring unit 14 monitors voltages and the like of the respective cells 12 by using voltage detection lines 18. A resistor is attached to a metal bus bar (not illustrated) coupling the cells 12 together, and a heater 1 (20-1) includes, for example, four cells coupled in series. The heater 1 receives, through harnesses 26, a voltage from a power supply 28 installed outside and raises the temperature of cells 1 to 4.

The overall cell balancing is typically performed by using resistors (not illustrated) of a monitoring board in the cell monitoring unit 14. That is, each cell is provided with a corresponding one of the resistors, and the power of a cell having a high SOC is consumed by using the corresponding resistor in the monitoring board to adjust the SOC of the cell having the high SOC to the SOC of a cell having a low SOC.

SUMMARY

An aspect of the disclosure provides a method for raising a temperature of a battery module for a vehicle. The method includes generating heat in one or more resistors of the battery module by supplying one or more voltages from at least a part of cells of the battery module. The battery module includes the cells coupled in series, and the one or more resistors configured to generate heat after being energized and cause temperature of the cells to be raised. Voltages of the cells are subjected to monitoring and controlling by a cell monitoring unit of the battery module.

An aspect of the disclosure provides a cell balancing method using the above-mentioned method. The cell balancing method includes: causing the cell monitoring unit to measure a first state of charge of a first cell of the cells and a second state of charge of a second cell of the cells; and in a case where the first state of charge is higher than the second state of charge, supplying with priority a voltage to the one or more resistors from the first cell.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the temperature increase method disclosed in JP-A No. 2010-097923, an external power supply for heaters is separately used. Harnesses extending from the external power supply to the heaters are thus long and exhibit a power loss leading to a low efficiency in raising the temperature. In addition, in the cell balancing method according to the related art, the resistors of the monitoring board of the cell monitoring unit that are used to consume power do not have a high capacity and thus consume low power to adjust the SOC of the cell having a high SOC to the SOC of the cell having a low SOC, and thus it takes a long time to adjust the SOC.

Embodiments of the disclosure have been made to address the issue above. It is desirable to provide a battery-module temperature increase method and a cell balancing method using the same that are able to raise the temperature of a battery module included in a vehicle in a cold environment and to perform cell balancing on the battery module efficiently.

Hereinafter, the embodiments of the battery-module temperature increase method and the cell balancing method using the same will be described in detail with reference to the drawings.

Figure 1A:
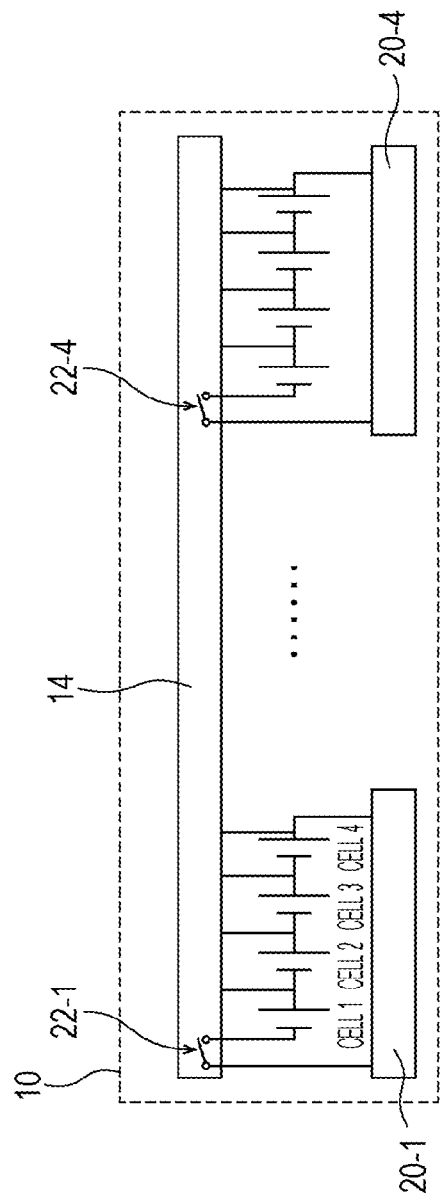
FIGS. 1A and 1B are diagrams illustrating a battery-module temperature increase method according to an embodiment of the disclosure.
Figure 1B:
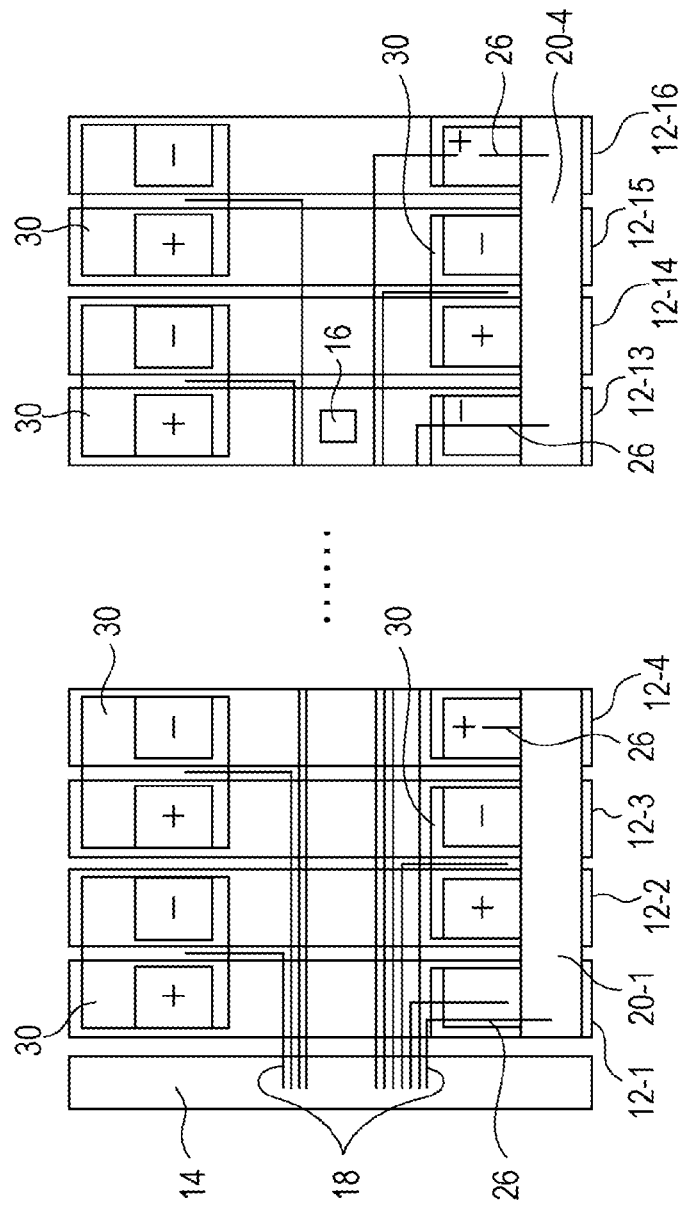

FIGS. 1A and 1B are each a diagram illustrating a battery-module temperature increase method of an embodiment of the disclosure. In this embodiment, a battery module having 16 cells will be described as an example. FIG. 1A is a conceptual diagram, and FIG. 1B is a schematic plan diagram.

The battery module 10 includes cells 12 and a cell monitoring unit 14. FIG. 1B illustrates the arrangement of the cells 12. A cell 1, a cell 2, a cell 3, a cell 4, ..., a cell 12, a cell 13, a cell 14, a cell 15, and a cell 16 are arranged in this order from the left and are denoted by 12-1 to 12-16, respectively. One of metal bus bars 30 couples the positive electrode of the cell 1 and the negative electrode of the cell 2 together. Likewise, one of the bus bars 30 couples the positive electrode of the cell 2 and the negative electrode of the cell 3 together. All of the cells 1 to 16 are electrically coupled in series and each have a predetermined voltage. Voltage detection lines 18 for detecting the respective voltages of the cells 1 to 16 are respectively coupled to the negative electrode of the cell 1, a node between the positive electrode of the cell 1 and the negative electrode of the cell 2, a node between the positive electrode of the cell 2 and the negative electrode of the cell 3, ..., a node between the positive electrode of the cell 15 and the negative electrode of the cell 16, and the positive electrode of the cell 16. The voltage detection lines 18 are coupled to the cell monitoring unit 14.

Resistors that are heating elements are each attached to a corresponding one of the bus bars 30 coupling corresponding ones of the electrodes together or attached to a corresponding one of the electrodes. In one example, a resistor is attached to the negative electrode of the cell 1, two resistors are attached to one of the bus bars 30 that couples the positive electrode of the cell 2 and the negative electrode of the cell 3 together, and a resistor is attached to the positive electrode of the cell 4. A total of 16 resistors are attached in the above-described manner. The resistors are grouped and coupled in series every four resistors, and the grouped resistors each serve as a corresponding one of heaters 1, 2, 3, and 4. Each of the heaters 1, 2, 3, and 4 is coupled to two harnesses 26. One of the harnesses 26 is coupled to the cell monitoring unit 14, and the other is coupled to the positive electrode of a corresponding one of the cell 4, the cell 8, the cell 12, and the cell 16.

To monitor the voltage and the like of each cell, to raise the temperature of the battery module 10, and to perform the cell balancing (described later), various switches, terminals, circuits, and other components (not illustrated) are included in the cell monitoring unit 14. In this embodiment, to energize the heater 1 (20-1), a switch 1 (22-1) is provided for turning on or off (enabling or disabling conduction between) one of the harnesses 26 coupled to the heater 1 (20-1) and one of the voltage detection lines 18 coupled to the negative electrode of the cell 1 (12-1). Likewise, a switch 2 (22-2) is provided for turning on or off one of the harnesses 26 coupled to the heater 2 (20-2) and one of the voltage detection lines 18 coupled to the node between the positive electrode of the cell 4 and the negative electrode of the cell 5. Likewise, a switch 3 (22-3) and a switch 4 (22-4) are provided.

In response to turning on the switch 1 (22-1), the series voltage of the cells 1, 2, 3, and 4 is supplied to the heater 1 (20-1). In response to turning on the switch 2 (22-2), the series voltage of the cells 5, 6, 7, and 8 is supplied to the heater 2 (20-2). Likewise, in response to turning on the switches 3 and 4, the series voltage of the cells 9, 10, 11, and 12 is supplied to the heater 3, and the series voltage of the cells 13, 14, 15, and 16 is supplied to the heater 4, respectively.

In response to supplying the voltage to the heater 1 (20-1), the heater 1 (20-1) generates heat. The heat is transferred to the cells 1 to 4, and the temperature thereof is raised. Likewise, in response to supplying the voltages to the heaters 2, 3, and 4, the temperature of the whole battery module 10 is raised.

The temperature of the battery module 10 can be measured in such a manner that a temperature sensor 16 such as a thermistor is attached to a cell element, for example, the cell 13 (12-13). The temperature sensor 16 is not necessarily attached to every cell. The temperature of a cell without the temperature sensor 16 may be estimated from the actual measurement value of the cell with the temperature sensor 16.

The voltage is supplied to the heaters 1 to 4 from the respective cells 12 of the battery module 10. The external power supply is not used, the harnesses 26 to energize the heaters 1 to 4 are short, and a voltage drop due to the harnesses 26 can be ignored. Further, the use of high capacity resistors of the heaters 1 to 4 enables to generate a higher heating value, that is, enables to generate a large amount of heat in the heaters 1 to 4. The temperature of the battery module 10 can be raised efficiently in this manner.

Figure 2:
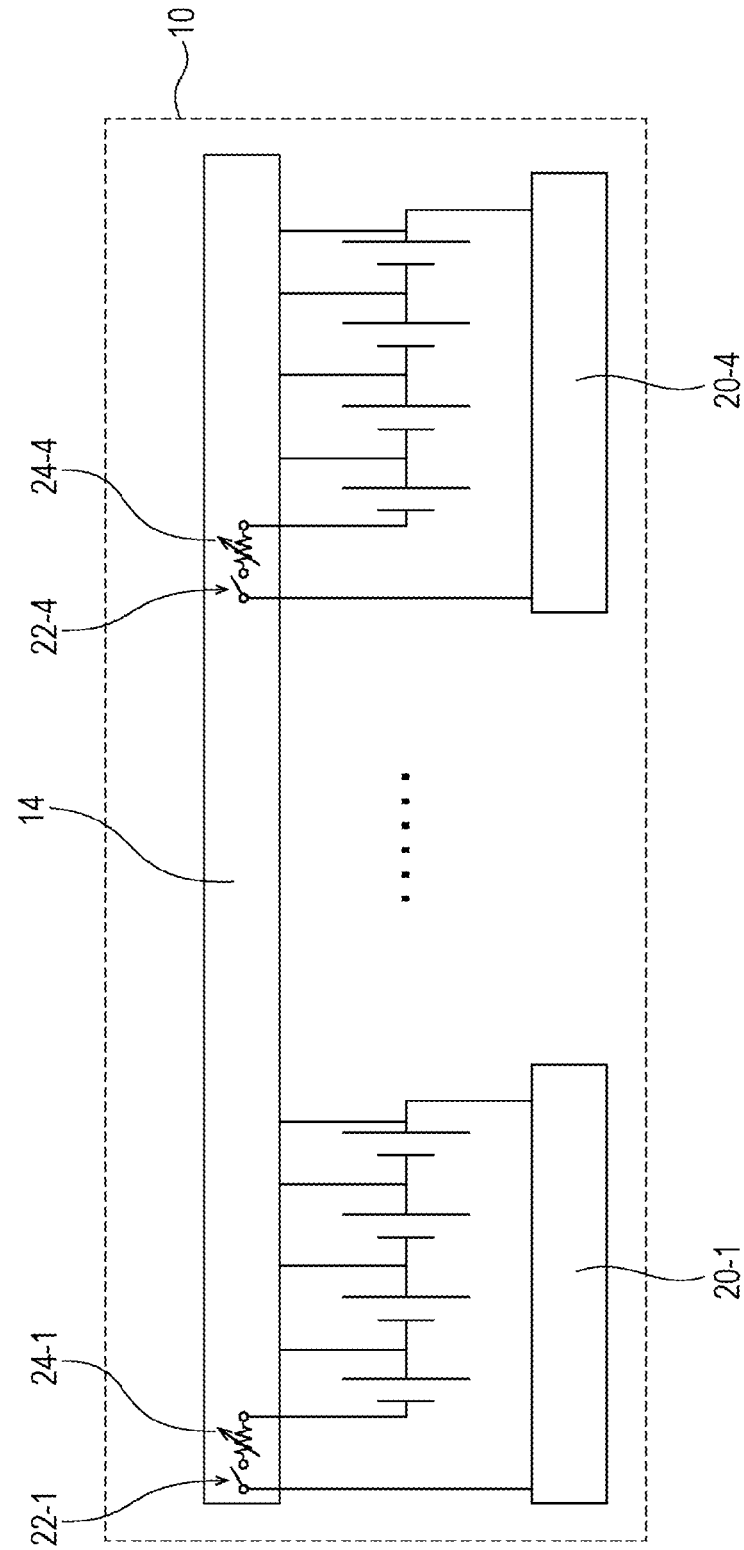
FIG. 2 relates to a battery-module temperature increase method according to an embodiment of the disclosure.

FIG. 2 illustrates another embodiment of the battery-module temperature increase method. A circuit in the embodiment is basically the same as the circuit illustrated in FIGS. 1A and 1B but includes variable resistors 24 for adjusting power consumed in the respective heaters 20-1 to 20-4. Each variable resistor 24 is coupled in series to a corresponding one of the switches 22. Adjusting a variable resistor 24 enables a voltage to be supplied to a corresponding one of the heaters 20-1 to 20-4 to be changed and thus the heating value of the corresponding one of the heaters 20-1 to 20-4 to be adjusted accurately. The heating value is also referred to as an amount of heat generated in the corresponding one of the heaters 20-1 to 20-4.

Figure 3:
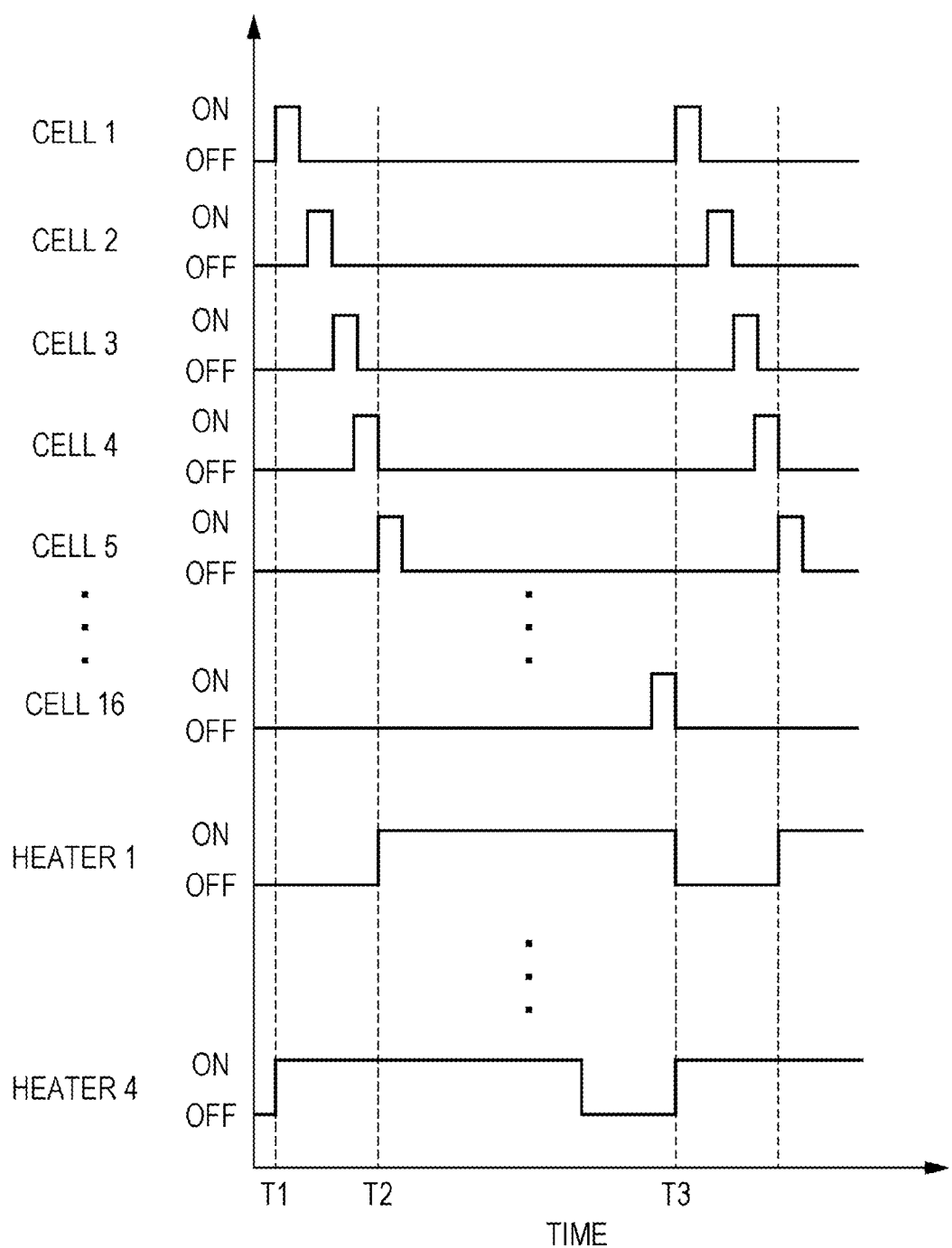
FIG. 3 relates to the battery-module temperature increase method of the embodiment and is a diagram illustrating how voltages of respective cells are measured and how heaters are energized.

FIG. 3 is a diagram illustrating how the cell monitoring unit 14 detects voltages of the respective cells 1 to 16 and how the power is supplied to the heaters 1 to 4 in the temperature increase circuit configured as in FIGS. 1A and 1B or FIG. 2. The horizontal axis represents time, and each of the cells 1 to 16 outputs a voltage in accordance with time sharing. For example, the cell 1 to the cell 4 serially output respective voltages in a short time from time T1 to time T2, and the cell monitoring unit 14 serially detects the voltages from the cells 1 to 4. The cells 1 to 4 output voltages simultaneously from time T2 to time T3 and thus supply the voltages to the heater 1. The time sharing is also set for the cells 5 to 8, the cells 9 to 12, and the cells 13 to 16 to enable the cell voltage detection and the voltage supply to the heaters 2, 3, and 4. The cell voltage detection and the temperature increase in the battery module 10 are performed in this manner.

Figure 4:
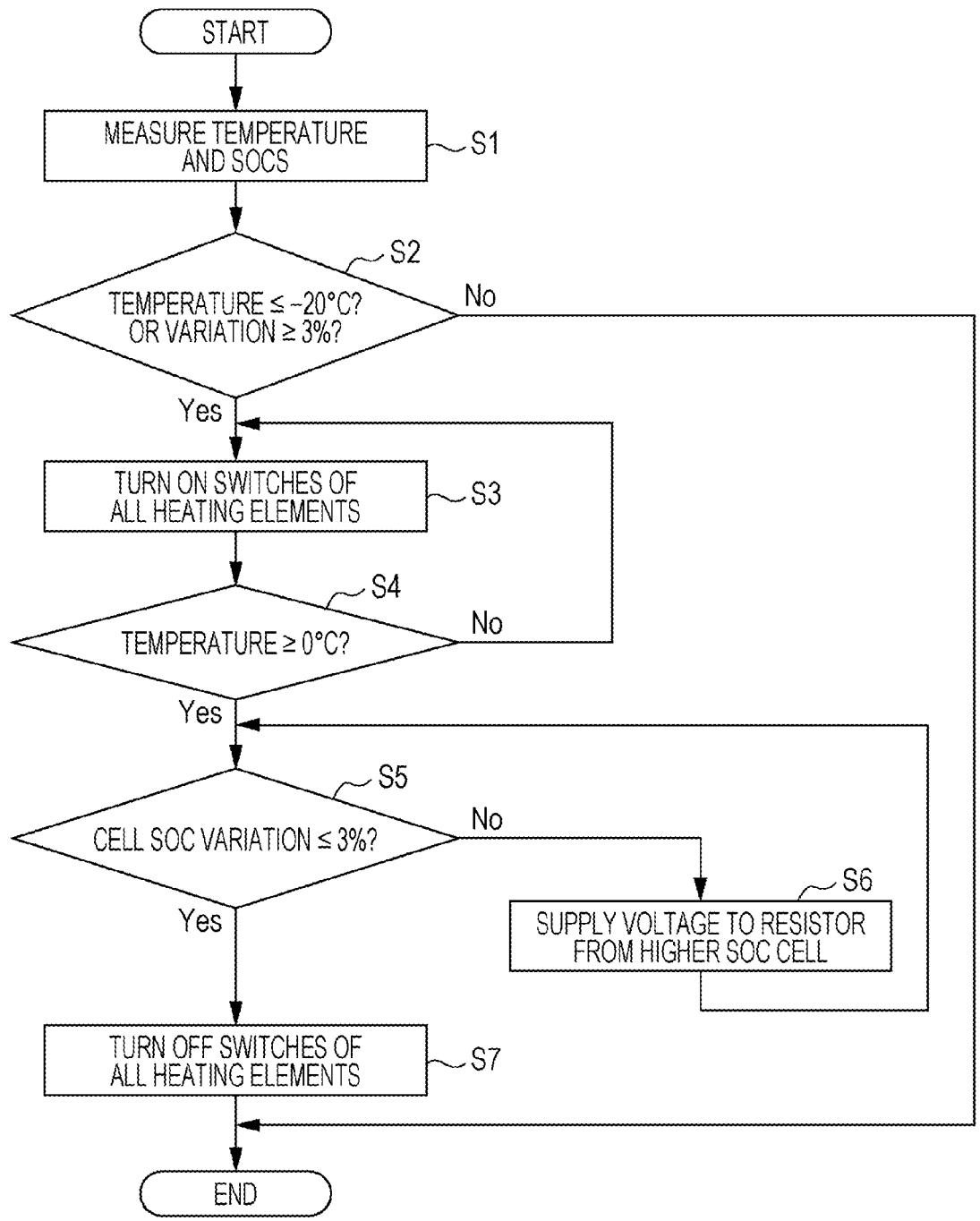
FIG. 4 is a flowchart of a battery-module cell balancing method of the embodiment.

FIG. 4 is a flowchart of a battery-module cell balancing method of an embodiment of the disclosure. First, the temperature of a battery module and the SOC of cells are measured (step S1). If the battery module temperature is lower than or equal to −20° C., or if SOC variation is higher than or equal to 3% (Yes in step S2), switches of all of heating elements, that is, the heating elements (heaters) 1 to 4 in this embodiment are turned on, and the battery module temperature is thereby raised (step S3). If the battery module temperature is higher than −20° C., or if the SOC variation is lower than 3% (No in step S2), the processing is terminated.

Raising the battery module temperature is continued until the temperature becomes higher than or equal to 0° C. (step S3 is continued in response to No in step S4). Note that the battery module temperature is measurable at an appropriate time. If the temperature becomes higher than or equal to 0° C. (Yes in step S4), the SOC of each cell is measured, and it is verified whether the variation is lower than or equal to 3% (step S5). If the variation is lower than or equal to 3% (Yes in step S5), the switches of all of the heating elements are turned off, and the processing is then terminated (step S7).

To measure the SOC, for example, the voltage of each cell measured by a cell monitoring unit may be converted to the SOC of the cell. In some embodiments, the SOC variation is lower than or equal to 3%. Continuous use of the battery module with a wide variation prevents the performance of the battery module from being sufficiently exerted and possibly hinders vehicle driving.

Figure 5:
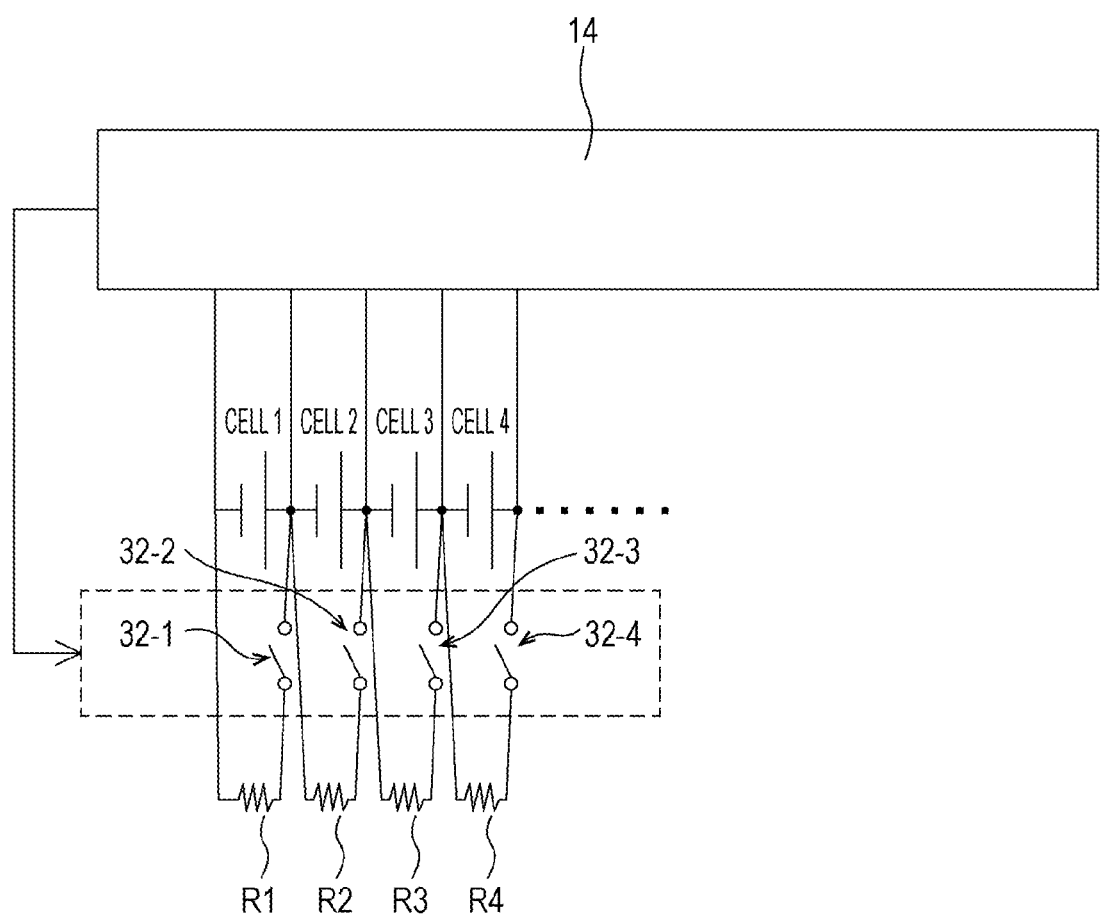
FIG. 5 is a diagram illustrating the battery-module cell balancing method of the embodiment.

If the battery module temperature becomes higher than or equal to 0° C. after being raised, the cell balancing is performed. If the cell variation is higher than 3% (No in step S5), one or more cells having a higher SOC than the other cells supply voltages to the respective resistors (step S6). For example, a circuit illustrated in FIG. 5 may be employed. The cells 1 to 16 are coupled in series, and resistors R1 to R16 are respectively coupled to the cells 1 to 16 with switches 32-1 to 32-16 interposed therebetween. If the resistors R1 to R4 are coupled in series, the resistors R1 to R4 correspond to the heater 1 illustrated in FIGS. 1A and 1B. The cell monitoring unit 14 controls the turning on and off of the switches 32-1 to 32-16.

For example, suppose a case where the SOC of the cell 1 is 60% and the SOC of each of the cells 2, 3, and 4 is 65%. Continuous use of the cell 1 causes the SOC of the cell 1 to be further reduced, making the cell balancing difficult. Hence, in this case, the switch 32-1 is turned off under the control of the cell monitoring unit 14 to prevent the cell 1 from supplying power. In contrast, the switches 32-2, 32-3, and 32-4 are kept on to supply power from the cells 2, 3, and 4.

This method enables the cell balancing by lowering the SOCs of the cells 2 to 4 to 60% while maintaining the SOC of the cell 1 at 60%. The same control is performed on the cells 5 to 8, the cells 9 to 12, and the cells 13 to 16, and thus all of the cells 1 to 16 can be balanced.

If the SOC variation becomes lower than or equal to 3% in this manner (Yes in step S5 in FIG. 4), energizing of all of the heating elements is stopped (step S7), and the processing is then terminated.

Figure 6:
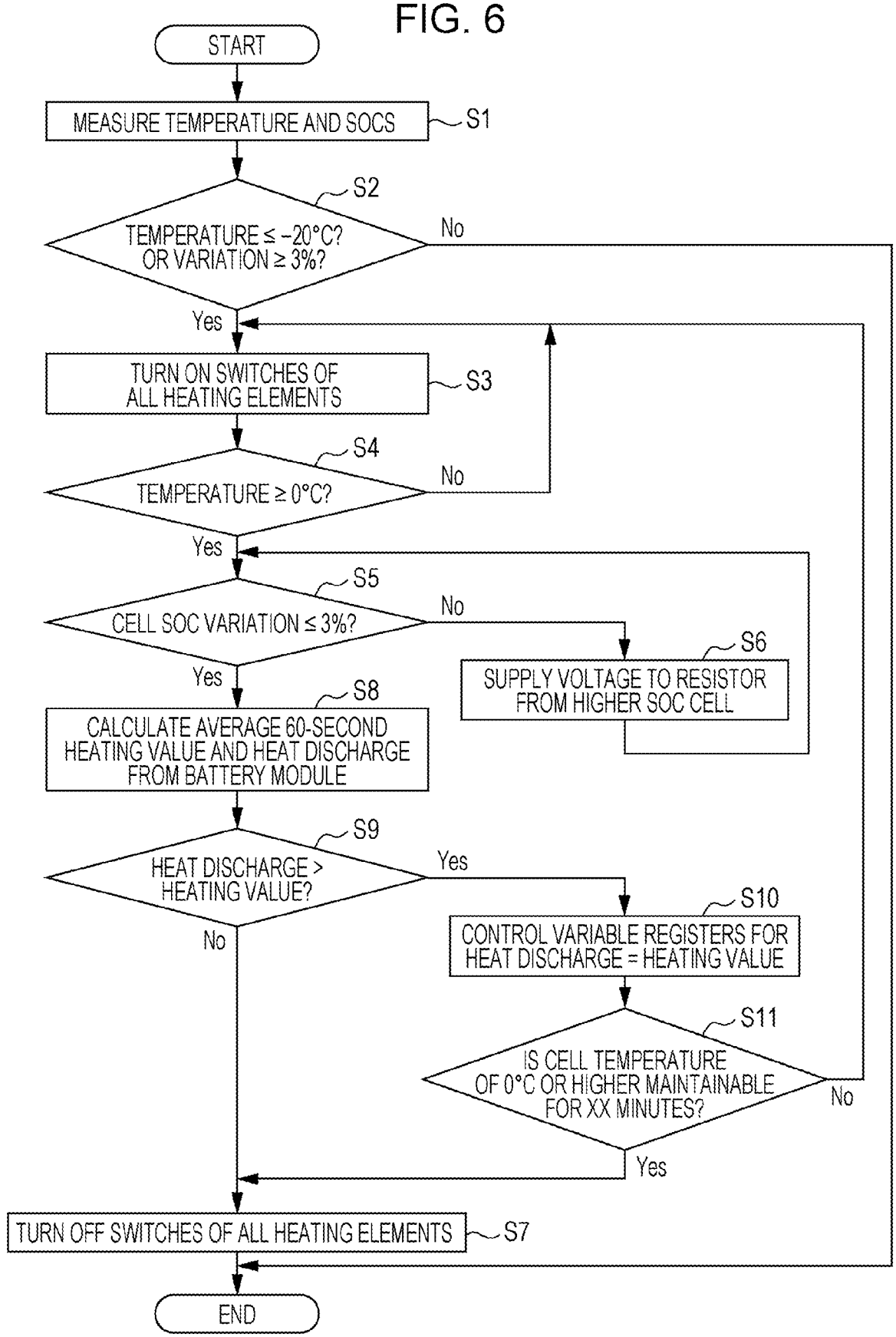
FIG. 6 is a flowchart for retaining the temperature of a battery module after the battery-module cell balancing method of the embodiment is performed.
Figure 7:
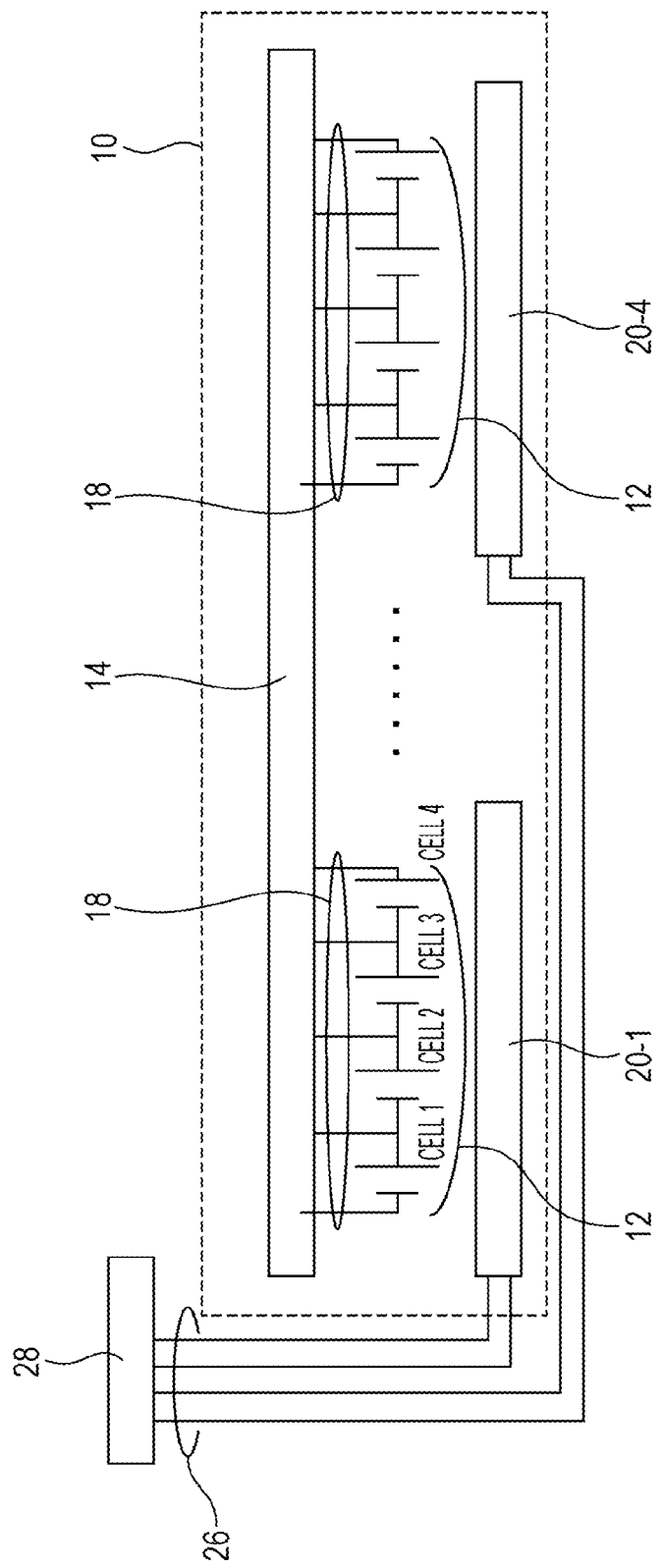
FIG. 7 is a diagram illustrating a battery-module temperature increase method according to the related art.

FIG. 6 is a flowchart in which steps for verifying that a battery module temperature of 0° C. or higher is maintainable for a predetermined time are added to the steps in FIG. 4. In one example, the steps for verifying that the battery module temperature of 0° C. or higher is maintainable for the predetermined time are inserted between steps S5 and S7 in FIG. 4.

If the SOC variation among the cells becomes lower than or equal to 3% (Yes in step S5), an average 60-second heating value of the heating elements (a first amount of heat) and a heat discharge from the battery module (a second amount of heat) are calculated (step S8). The calculation is performed by, for example, the cell monitoring unit. Supplying power to the resistors serving as the heating elements or to the heaters results in the heating values, while a low outside temperature causes the heat to be successively released from the battery module.

The average 60-second heating value can be obtained in such a manner that, for example, the heating values of all of the heaters are measured for about five minutes and converted to a heating value per 60 seconds. A calorimeter or the like is usable for the measurement. In addition, for example, a value of current flowing to each heater is also usable for the calculation. The heat discharge is also measurable with a calorimeter or other devices. The battery module temperature varying in five minutes may be measured, and the measurement value may be converted to heat discharge per 60 seconds by using the value of physical properties of the battery module (such as mass or specific heat). The heating value and the heat discharge may also be obtained by a known method.

Subsequently, the heat discharge is compared with the heating value (step S9). If the heat discharge is not higher than the heating value (No in step S9), power supply to all of the heating elements is stopped, and the processing is then terminated (step S7).

If the heat discharge is higher than the heating value (Yes in step S9), one or more of the variable resistors 24 illustrated in FIG. 2 are adjusted for a higher heating value (step S10). In one example, the resistance value of the one or more variable resistors 24 is approximated to zero. Whether the battery module temperature of 0° C. or higher is maintainable for the predetermined time is then calculated in consideration of the outside temperature or the like (step S11). The predetermined time is, for example, approximately three hours on the assumption that some shopping is done at a shopping mall or the like.

If the battery module temperature of 0° C. or higher is maintainable for the predetermined time (Yes in step S11), the power supply to all of the heating elements is stopped, and the processing is then terminated (step S7). If the battery module temperature of 0° C. or higher is not maintainable for the predetermined time (No in step S11), the processing returns to step S3, and the power supply to all of the heating elements is continued. Knowing the time in which the battery module temperature of 0° C. or higher is maintainable makes it possible to know the time in which the performance of the battery module is sufficiently exerted and contributes to safe vehicle driving.

According to the battery-module temperature increase method and the cell balancing method using the same of each embodiment, the voltages for raising the temperature of the battery module are supplied to the resistors from the cells of the battery module itself. Accordingly, the harnesses coupled to the resistors are short and do not exhibit a power loss, and the temperature increase efficiency is high. In addition, the resistors for raising the temperature are used for the cell balancing, and a cell having a low SOC does not supply a voltage to the corresponding resistor. The balancing time is thus short. Further, since the variable resistor is coupled between the resistor and corresponding cell that supplies power to the resistor, the heating value may be adjusted, and highly accurate control may be performed. One or more variable resistors may be coupled between one or more resistors and the cells.

Note that the disclosure is not limited to the embodiments described above, and various modifications may be made without departing from the scope of the spirit of the disclosure. For example, the case where the battery module has 16 cells is illustrated, but the disclosure is not limited to this case. In addition, four heating elements (heaters) are provided, and one heater includes four resistors and receives power from the four cells; however, the configuration of the disclosure is not limited to this configuration.

According to the battery-module temperature increase method of the embodiment, the voltages are supplied from the cells included in the battery module to the resistors serving as the heating elements for raising the temperature of the battery module. Accordingly, the harnesses coupled to the resistors are short and do not exhibit a power loss, and the temperature increase efficiency is high. In addition, not using the external power supply and the short length of the harnesses enable a compact battery module.

Since the voltages to be supplied to the resistors may be adjusted, the heating values of the resistors may be adjusted finely. That is, a high heating value due to a resistor may be decreased in such a manner that the value of current flowing to the resistor is decreased by increasing the resistance value of the corresponding variable resistor. This may prevent the SOC of the corresponding cell from being low unnecessarily.

In addition, the heat discharge from the battery module is compared with the total heating value of the resistors, and control is performed to reduce a difference between the heat discharge and the heating value. The time in which the battery module temperature is maintainable at, for example, 0° C. or higher may be calculated. The time in which the performance of the battery module is sufficiently exerted may thus be known, which contributes to safe vehicle driving.

According to the cell balancing method of the embodiment, a cell having a higher SOC is used in raising the temperature of the battery module, and the SOC thereof becomes low. In contrast, a cell having a lower SOC is not used in raising the temperature of the battery module, and the SOC thereof is maintained. The SOC of the cell having the higher SOC gradually approaches the SOC of the cell having the lower SOC, and the SOCs are balanced gradually. Further, since the resistors having a high capacity for heat generation are used instead of the resistors included in the cell monitoring unit that have a fairly low capacity and are not for heat generation, the cells consume a large amount of power, and thus the time to balance the cells is short.

According to the battery-module temperature increase method and the cell balancing method using the same of the embodiment of the disclosure, the cells serve as the power supply to generate heat in the resistors for raising the temperature of the battery module. Accordingly, not using the external power supply and the short length of the harnesses enable a compact battery module.

The invention claimed is:

1. A method for raising a temperature of a battery module for a vehicle, the method comprising generating heat in one or more resistors of the battery module by supplying one or more voltages from at least a part of cells of the battery module,
   wherein the battery module includes the cells coupled in series, and the one or more resistors configured to generate heat after being energized and cause a temperature of the cells to be raised,
   wherein voltages of the cells are subjected to monitoring and controlling by a cell monitoring unit of the battery module, and
   wherein one or more variable resistors are coupled between the one or more resistors and the cells,
   the method further comprising determining a resistance value of the one or more variable resistors based on a comparison of an amount of heat generated in the multiple resistors with an amount of heat being discharged from the battery module.

2. A cell balancing method using the method according to claim 1, the cell balancing method comprising:
   causing the cell monitoring unit to measure a first state of charge of a first cell of the cells and a second state of charge of a second cell of the cells; and
   in a case where the first state of charge is higher than the second state of charge, supplying with priority a voltage to the one or more resistors from the first cell.

3. A method for raising a temperature of a battery module for a vehicle, the method comprising generating heat in one or more resistors of the battery module by supplying one or more voltages from at least a part of cells of the battery module,
   wherein the battery module includes the cells coupled in series, and the one or more resistors configured to generate heat after being energized and cause a temperature of the cells to be raised,
   wherein voltages of the cells are subjected to monitoring and controlling by a cell monitoring unit of the battery module,
   wherein one or more variable resistors are coupled between the one or more resistors and the cells, and
   wherein the one or more resistors comprise multiple resistors,
   the method further comprising:
      comparing a first amount of heat that is a total of amounts of heat generated in the multiple resistors with a second amount of heat discharged from the battery module;
      setting, in a case where the second amount of heat is higher than the first amount of heat, a resistance value of the one or more variable resistors to zero to increase the first amount of heat; and
      increasing, in a case where the second amount of heat is lower than the first amount of heat, the resistance value of the one or more variable resistors to decrease a difference between the first amount of heat and the second amount of heat.

4. A cell balancing method using the method according to claim 3, the cell balancing method comprising:
   causing the cell monitoring unit to measure a first state of charge of a first cell of the cells and a second state of charge of a second cell of the cells; and
   in a case where the first state of charge is higher than the second state of charge, supplying with priority a voltage to the multiple resistors from the first cell.

* * * * *